March 21, 1933. A. F. PHELPS 1,902,662
PACKING RING FOR SHAFT BEARINGS
Original Filed April 6, 1931
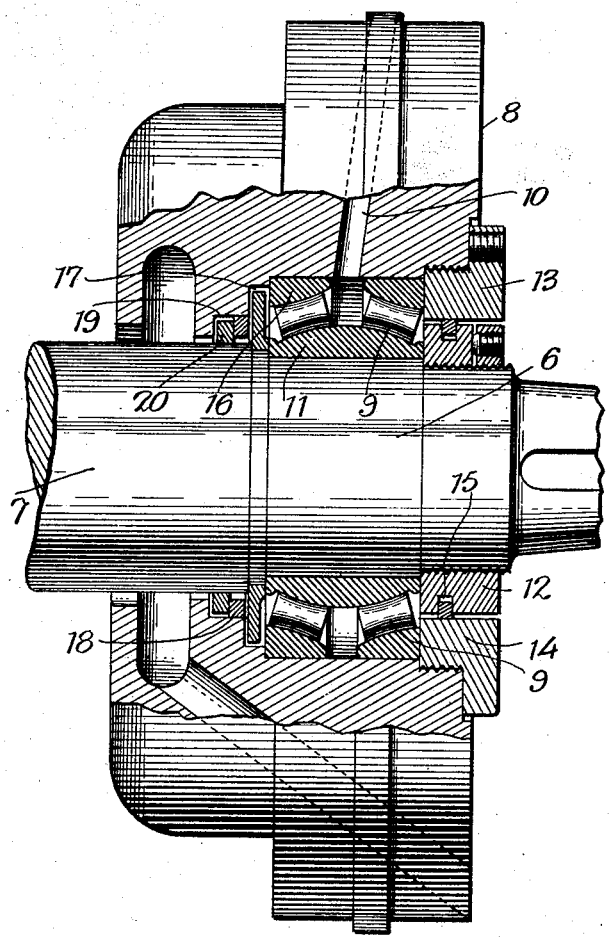
Inventor,
Arthur F. Phelps.
By Herbert L. Davis
Attorney Patented Mar. 21, 1933

1,902,662

UNITED STATES PATENT OFFICE

ARTHUR F. PHELPS, OF BLUEFIELD, WEST VIRGINIA, ASSIGNOR TO WEST VIRGINIA ARMATURE CO., OF BLUEFIELD, WEST VIRGINIA

PACKING RING FOR SHAFT BEARINGS

Application filed April 6, 1931, Serial No. 528,119. Renewed December 12, 1932.

The present invention relates to packing rings for shaft bearings and consists in the combinations and arrangements of elements hereinafter described and particularly set forth in the accompanying claim.

The invention has for its purpose to provide a means for effectively preventing the leakage of lubricant from the journal of the bearing to the outside, and also to avoid the ingress of dirt or other foreign matter into the journal casing, and which will not appreciably alter the present type or standard construction of shaft bearings. It is further proposed to produce and install the apparatus at minimum cost.

While attempts have heretofore been made to accomplish the above named desirable results, such efforts have not been successful. In these cases it is the usual practice to employ felt gaskets, multiple grease steel, labyrinth rings, or by having long and closely fitting surfaces running in intimate contact; or by a combination of these elements. As already stated, these efforts so far as known do not effectively prevent either the leakage of oil or grease from the journal casing or the entrance of foreign matter from the atmosphere.

Summarily stated the method herein proposed consists of using a novel construction and combination of expanding and contractile rings constructed of steel, cast iron, bronze, or other suitable metals, and so located that they effectively seal the bearing compartment and thereby prevent the loss of lubricant or entrance of foreign matter of any kind. The invention as disclosed herein is specially directed to a journal bearing for an armature shaft, particularly the pinion end thereof, though it will be understood the principle involved may equally well apply to journal bearings for shafts generally.

A further adaptation of the invention disclosed herein is shown in my co-pending application for U. S. Letters Patent entitled "Packing rings for shaft bearings," Serial No. 528,120, filed April 6, 1931.

The invention is shown by way of illustration in the accompanying drawing which is:

A central sectional view, showing the application of the packing rings on the pinion end of an armature shaft.

Referring to the construction in further detail, 6 indicates the pinion end of an armature shaft 7 suitably mounted in the housing 8 on the roller journal bearings 9 as shown, and to which bearing lubricant is directed through the channelways 10 formed in the housing in any approved way. In lieu of roller bearings 9 the usual anti-friction ball bearings may be employed together with the ordinary races or bearing rings 11, as will be understood.

A nut member 12 screw threaded on the end 6 of the shaft 7 fits wholly within the removable part or bushing 13 of the bearing and contacts with the inner race or ring 11 of the roller bearing, and an expansible ring 14 located within an annular channelway 15 formed in the periphery of the nut 12 has intimate frictional contact with the inner surface of the journal bearing member 13 as shown. Said bushing 13 contacts with the outer race member 16 of the bearing. On the opposite side of the journal bearing the shaft 7 is provided with a collar 16 fitting within an annular clearance 17 formed in the housing immediately adjacent the roller bearing rings 11. An expansible packing ring 18 fitted around the shaft within the chamber 19 has tight frictional contact with the inner annular wall of said chamber immediately adjacent the collar 16, and a contractile packing ring 20 tightly fitting on and rotated with the shaft 7 has close frictional engagement with the expansible ring 19. Both the expansible and contractile rings may be made of steel, cast iron or bronze.

It will, therefore, be seen that the expansible ring 14 on the nut 12, together with the expansible ring 18 and contractile ring 20, will cooperate to effectively seal the journal bearing on either side thereof and effectively prevent any leakage of lubricant out of the casing and in like manner said packing rings will keep out the ingress of dirt or any other foreign matter from the atmosphere. It will be further noted the shaft 7 has slightly stepped or progressively reduced diameters to receive the collar 17, race 11, and nut 12.

It will be understood the invention as herein disclosed is not limited to the details of construction shown and described, and that these may be varied widely without departing from the spirit of the invention as defined by the claim.

What is claimed as new is:

In combination, a shaft having progressive reduced diameter portions, a shaft bearing comprising an outer and an inner race member, a housing, a bushing screw-threaded into said housing and engaging the outer of said races, a grooved nut screw-threaded on the shaft wholly within said bushing and adjustably bearing against the inner race member of the bearing, an expansible packing ring located in said nut groove and tightly fitting against said bushing, a collar on the inner-most reduced diameter of the shaft and adjacent the inner side of the bearing races, an expansible packing ring in the housing immediately adjacent said collar, and a contractile packing ring on the shaft lying immediately against said expansible ring, said packing rings having intimate contact with each other, substantially as set forth.

In testimony whereof, I affix my signature.

ARTHUR F. PHELPS.